United States Patent
Shinohara (10) Patent No.: US 11,328,448 B2
(45) Date of Patent: May 10, 2022

(54) IMAGE PROCESSING METHOD AND IMAGE PROCESSING APPARATUS

(71) Applicant: TOSHIBA TEC KABUSHIKI KAISHA, Tokyo (JP)

(72) Inventor: Masatoshi Shinohara, Mishima Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 156 days.

(21) Appl. No.: 16/576,679

(22) Filed: Sep. 19, 2019

(65) Prior Publication Data
US 2020/0311980 A1 Oct. 1, 2020

(30) Foreign Application Priority Data
Mar. 25, 2019 (JP) .............................. JP2019-056523

(51) Int. Cl.
| | |
|---|---|
| *G06V 30/10* | (2022.01) |
| *G06T 7/90* | (2017.01) |
| *G06F 16/16* | (2019.01) |
| *G06F 9/54* | (2006.01) |
| *G06T 1/00* | (2006.01) |

(Continued)

(52) U.S. Cl.
CPC .................. *G06T 7/90* (2017.01); *G06F 9/54* (2013.01); *G06F 16/164* (2019.01); *G06T 1/0007* (2013.01); *G06V 10/225* (2022.01); *G06V 10/768* (2022.01); *G06V 30/40* (2022.01); *G06T 2207/10024* (2013.01);
(Continued)

(58) Field of Classification Search
CPC ............. G06T 2207/10024; G06T 7/90; G06T 1/0007; G06F 16/164; G06F 9/54; G06K 2209/01; G06K 9/00–82; G06V 30/00–41; G06V 10/768; G06V 10/225
See application file for complete search history.

(56) References Cited

U.S. PATENT DOCUMENTS

| | | | |
|---|---|---|---|
| 10,198,436 B1* | 2/2019 | Dockhorn | ............. G06F 16/345 |
| 2005/0063009 A1* | 3/2005 | Ehara | .................... G06K 9/325 |
| | | | 358/1.16 |

(Continued)

FOREIGN PATENT DOCUMENTS

| | | |
|---|---|---|
| JP | 2010-072826 A | 4/2010 |
| WO | WO-2009/063329 A1 | 5/2009 |

OTHER PUBLICATIONS

Da Silva Barboza, Ricardo, et al., "Using Readers' Highlighting on Monochromatic Documents for Automatic Text Transcription and Summarization," 2011 International Conference on Document Analysis and Recognition, Sep. 30, 2011, pp. 212-216, XP055574178, DOI: 10.1109/ICDAR.2011.51, ISBN: 978-1-4577-1350-7.

(Continued)

*Primary Examiner* — Sean T Motsinger
(74) *Attorney, Agent, or Firm* — Foley & Lardner LLP (57) ABSTRACT

According to one embodiment, an image processing method causes a computer to function as an image processing apparatus including an acquisition unit and a control unit. The acquisition unit acquires image data. The control unit performs a control process of detecting a character string of each color included in the image data and associating the character string with the color using the character string of the color.

7 Claims, 5 Drawing Sheets

108

| COLOR | CONTENT OF CONTROL PROCESS |
|---|---|
| BLACK | STORED AS CONTENT OF FILE 1 |
| RED | DESIGNATED AS FILE NAME OF FILE 1 |
| BLUE | DESIGNATED AS FOLDER NAME |
| GREEN | STORED AS CONTENT OF FILE 2 |
| YELLOW | DESIGNATED AS FILE NAME OF FILE 2 |
| ⋮ | ⋮ |
| ⋮ | ⋮ |

(51) Int. Cl.
  *G06V 10/22*     (2022.01)
  *G06V 10/70*     (2022.01)
  *G06V 30/40*     (2022.01)
  *H04N 1/00*      (2006.01)

(52) U.S. Cl.
  CPC .... *G06T 2207/30176* (2013.01); *G06V 30/10* (2022.01); *H04N 1/00331* (2013.01); *H04N 2201/0094* (2013.01)

(56) References Cited

U.S. PATENT DOCUMENTS

| | | | | |
|---|---|---|---|---|
| 2007/0206851 | A1* | 9/2007 | Itoh | G06K 9/2063 382/164 |
| 2009/0092317 | A1* | 4/2009 | Nagarajan | G06K 9/2063 382/173 |
| 2010/0079804 | A1* | 4/2010 | Otsuka | H04L 67/02 358/1.15 |
| 2012/0081724 | A1* | 4/2012 | Tagaki | H04N 1/40062 358/1.9 |
| 2014/0281948 | A1* | 9/2014 | Sei | G06F 40/169 715/268 |
| 2019/0028607 | A1* | 1/2019 | Katsura | G06K 9/00449 |
| 2019/0065843 | A1* | 2/2019 | Matsumoto | G06K 9/6878 |
| 2020/0028987 | A1* | 1/2020 | Gopalakrishnan | G06K 9/00463 |
| 2020/0126268 | A1* | 4/2020 | Zhou | G06F 16/5838 |
| 2020/0133650 | A1* | 4/2020 | Tung | H04L 63/10 |
| 2020/0311980 | A1* | 10/2020 | Shinohara | G06T 1/0007 |

OTHER PUBLICATIONS

Extended European Search Report issued in European Patent Application No. 19209980.2 dated Jun. 9, 2020.

* cited by examiner

| COLOR | CONTENT OF CONTROL PROCESS |
|---|---|
| BLACK | STORED AS CONTENT OF FILE 1 |
| RED | DESIGNATED AS FILE NAME OF FILE 1 |
| BLUE | DESIGNATED AS FOLDER NAME |
| GREEN | STORED AS CONTENT OF FILE 2 |
| YELLOW | DESIGNATED AS FILE NAME OF FILE 2 |
| ⋮ | ⋮ |
| ⋮ | ⋮ |

| COLOR | CONTENT OF CONTROL PROCESS |
|---|---|
| BLACK | ASSOCIATION WITH "ID01" |
| RED | ASSOCIATION WITH "ID02" |
| BLUE | ASSOCIATION WITH "ID03" |
| ⋮ | ⋮ |
| ⋮ | ⋮ |

FIG. 7

IMAGE PROCESSING METHOD AND IMAGE PROCESSING APPARATUS

CROSS-REFERENCE TO RELATED APPLICATION

This application is based upon and claims the benefit of priority from Japanese Patent Application No. 2019-056523, filed Mar. 25, 2019, the entire contents of which are incorporated herein by reference.

FIELD

Embodiments described herein relate generally to an image processing method and an image processing apparatus.

BACKGROUND

Some image processing systems perform an optical character recognition (OCR) process on the entire region or a designated region of image data to acquire a character string. The character string acquired through the OCR process may be further subjected to an operation such as copying or storing. However, after the OCR process, it is necessary to perform an operation on the acquired character string. This operation adds complexity to image processing and is undesirable.

DETAILED DESCRIPTION

Embodiments generally relate to an image processing method and an image processing apparatus which reduce the complexity of an operation on a character string acquired through an OCR process.

In general, according to one embodiment, an image processing method causes a computer to function as an image processing apparatus including an acquisition unit and a control unit. The acquisition unit acquires image data. The control unit performs a control process of detecting a character string of each color included in the image data and associating the character string with the color using the character string of the color.

Hereinafter, an image processing method and an image processing apparatus according to an embodiment will be described with reference to the drawings.

Figure 1:
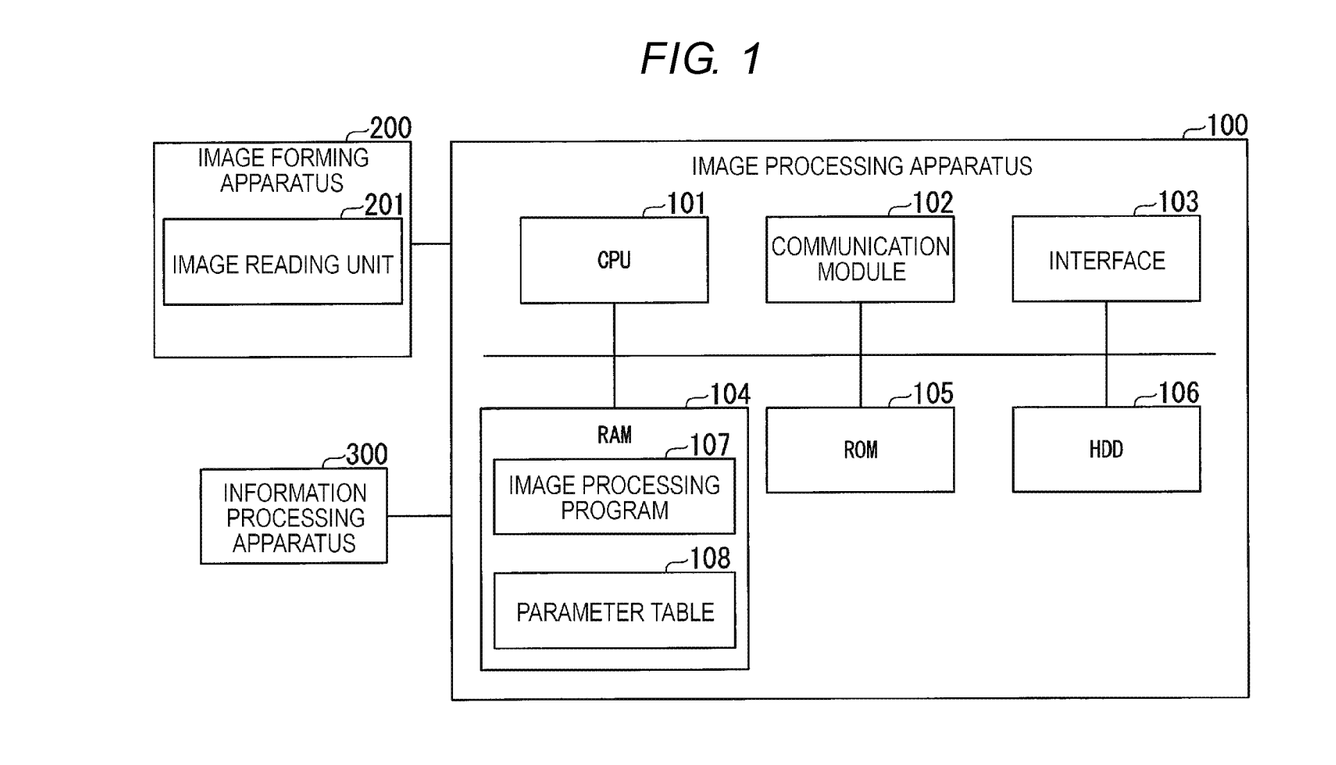
FIG. 1 is a block diagram illustrating a hardware configuration example of an image processing apparatus according to an embodiment.

FIG. 1 is a block diagram illustrating an apparatus configuration example of an image processing system including an image processing apparatus 100 according to the embodiment. The image processing system illustrated in FIG. 1 includes the image processing apparatus 100, an image forming apparatus 200, and an information processing apparatus 300. The image processing apparatus 100 is connected to the image forming apparatus 200 via a communication cable. The image forming apparatus 200 is, for example, a multi-functional peripheral. The image forming apparatus 200 includes an image reading unit 201. The image reading unit 201 optically reads a target document image to generate image data with color information. The image reading unit 201 is configured using an image sensor, such as a charge coupled device (CCD) or complementary metal oxide semiconductor (CMOS) sensor. The image reading unit 201 outputs the generated image data to the image processing apparatus 100.

The image processing apparatus 100 acquires the image data output by the image reading unit 201. The image processing apparatus 100 performs a control process of detecting a character string of each color included in the image data and associating the character string for each color using the character string of the color. The image data includes color information. The image data also includes an image of the character string. In other words, the image data is, for example, image data of a document image in which the character string is described. The image data may be image data of a screen of a whiteboard. The image data may be image data generated through imaging in an imaging apparatus.

The image processing apparatus 100 is a computer that includes a central processing unit (CPU) 101, a communication module 102, and an interface 103. The image processing apparatus 100 further includes a random access memory (RAM) 104, a read-only memory (ROM) 105, a hard disk drive (HDD) 106, and the like. The communication module 102 may perform wireless communication or wired communication with each of the image forming apparatus 200 and the information processing apparatus 300. The RAM 104 stores an image processing program 107 and a parameter table 108.

First Embodiment

Figure 2:
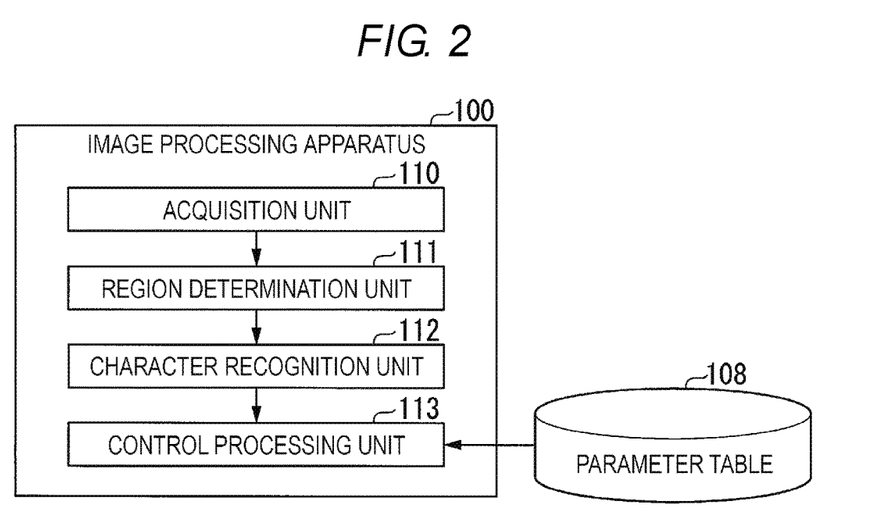
FIG. 2 is a schematic block diagram illustrating a functional configuration example of the image processing apparatus according to a first embodiment.

FIG. 2 is a schematic block diagram illustrating a functional configuration example of the image processing apparatus 100 according to a first embodiment.

The CPU 101 (see FIG. 1) reads the image processing program 107 (see FIG. 1) stored in the ROM 104 or the like and executes the image processing program. Thus, the image processing apparatus 100 realizes each function of an acquisition unit 110, a region determination unit 111, a character recognition unit 112, and a control processing unit 113. Some of the functions 110 to 113 may be realized by an electronic circuit in the image processing apparatus 100.

The acquisition unit 110 acquires image data of a document image. The region determination unit 111 detects a color region of each color from the image data. The color region indicates a range in which a character string is described with a similar color to that of the image data. In other words, the color region indicates a region including a unity of the character string with the similar color in the image data. The color region may be a range in which the character string is decorated with the similar color in the image data. For example, the decoration is realized by drawing a line to overlap the character string or surrounding the character string with a highlighter, a marker, or the like. In the embodiment, the similar color includes a range of the color considered to be a given color. In addition, the similar color includes a range of the color specified with the name of a color such as "red" or "blue."

The character recognition unit 112 detects a character string (text data) included in each color region through an OCR process with regard to the each color region detected by the region determination unit 111. Specifically, the character recognition unit 112 recognizes characters in each color region and specifies which character each character is. The character recognition unit 112 detects a character string including a specific character. The character string may include only one character. The character may include a numerical value, a mathematical formula, a sign, or the like.

The control processing unit 113 acquires a control process associated with each color with reference to the parameter table 108. The control processing unit 113 performs the control process associated with each color using the character string recognized in the color region of the color.

An example of the parameter table 108 will be described below with reference to FIG. 4.

Figure 3:
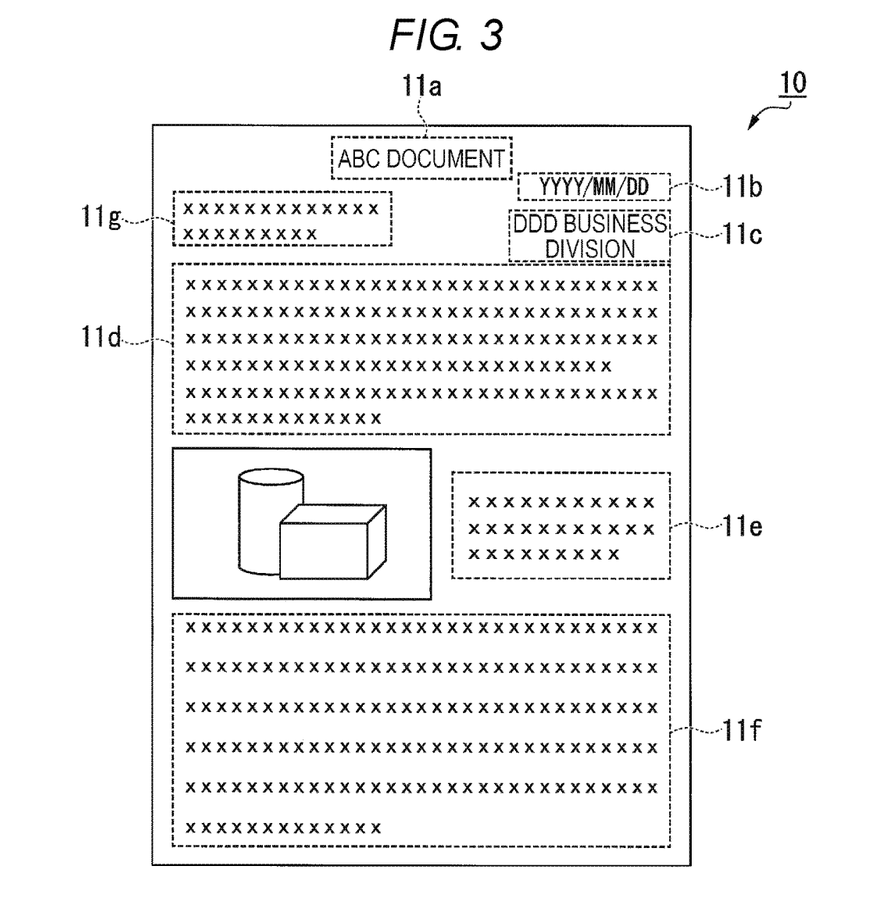
FIG. 3 is a diagram illustrating an example of a document image.

FIG. 3 is a diagram illustrating an example of a document image 10 according to the embodiment. The image processing apparatus 100 performs a process using image data of the document image 10 illustrated in FIG. 3 as an input. The document image 10 illustrated in FIG. 3 includes character strings and diagrams, such as graphs. The character strings included in the document image 10 include, for example, a document name, a date, a division name, and sentences.

Specifically, in the document image 10 illustrated in FIG. 3, each unity of the character string is described with a different color. For example, in a color region 11*a* of the document image 10, a document name "ABC document" is described with red. In a color region 11*b*, a date "YYYY/MM/DD" is described with black and a line is drawn on the date with a yellow highlighting marker. In a color region 11*c*, a division name "DDD business division" is described with blue. In color regions 11*d* and 11*f*, each document is described with black. In color regions 11*e* and 11*g*, each document is described with black and the document is surrounded by a green marker. For example, in the color regions 11*e* and 11*g*, documents are surrounded by ellipses, rectangles, or the like.

In this way, the document image 10 in FIG. 3 includes images of the character strings with a plurality of colors. The document image 10 illustrated in FIG. 3 includes the character strings with five colors. The number of colors of the character strings included in the document image 10 is not limited to this example. The document image 10 in the embodiment may include images of character strings with two or more colors.

Figure 4:
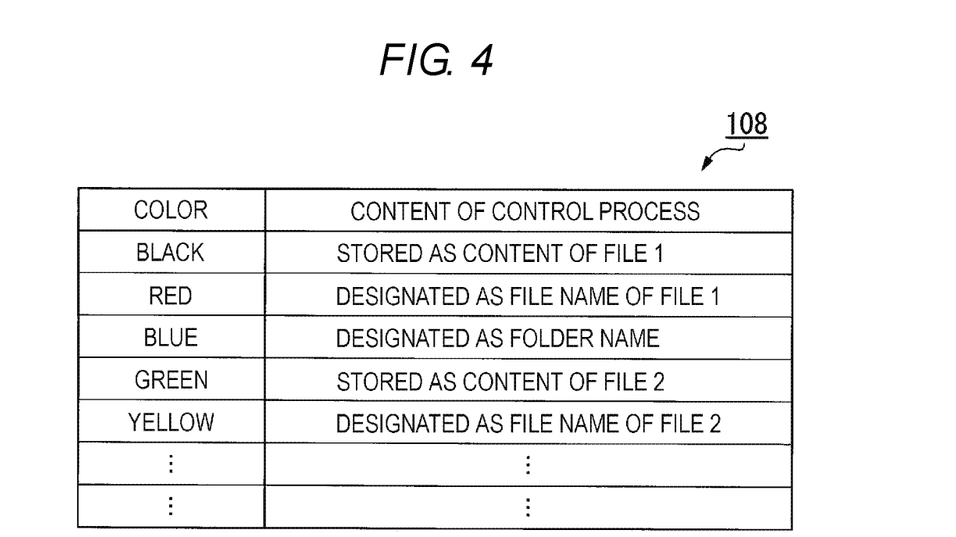
FIG. 4 is a diagram illustrating a first example of parameters.

FIG. 4 is a diagram illustrating an example of the parameter table 108 according to the embodiment. The parameter table 108 has a correspondent relation between colors and control processes. In the parameter table 108 illustrated in FIG. 4, a control process "STORED AS CONTENT OF FILE 1" is associated with color "black." A control process "DESIGNATED AS FILE NAME OF FILE 1" is associated with color "red." A control process "DESIGNATED AS FOLDER NAME" is associated with color "blue." A control process "STORED AS CONTENT OF FILE 2" is associated with color "green." A control process "DESIGNATED AS FILE NAME OF FILE 2" is associated with color "yellow."

That is, in the parameter table 108 illustrated in FIG. 4, File 1 that stores a character string of a color region of black is designated so that the character string of the color region of red is generated as a file name. Further, File 2 that stores a character string of the color region of green is designated so that the character string of the color region of yellow is generated as a file name. Files 1 and 2 are designated so as to be generated under a folder with a folder name of the character string of the color region of blue.

In the embodiment, the parameter table 108 is stored in advance in the image processing apparatus 100 as will be exemplified, but an exemplary embodiment is not limited to this example. The parameter table 108 may be input to the image processing apparatus 100 along with the image data. The parameter table 108 may be different for each piece of image data or may be used in common between a plurality of pieces of image data. Information of the parameter table 108 may be input by a user in the control process.

In the parameter table 108 illustrated in FIG. 3, content of the control process is associated with each color, but an exemplary embodiment is not limited to this example. In the parameter table 108, the content of the control processes may be associated with only some of the plurality of colors.

Figure 5:
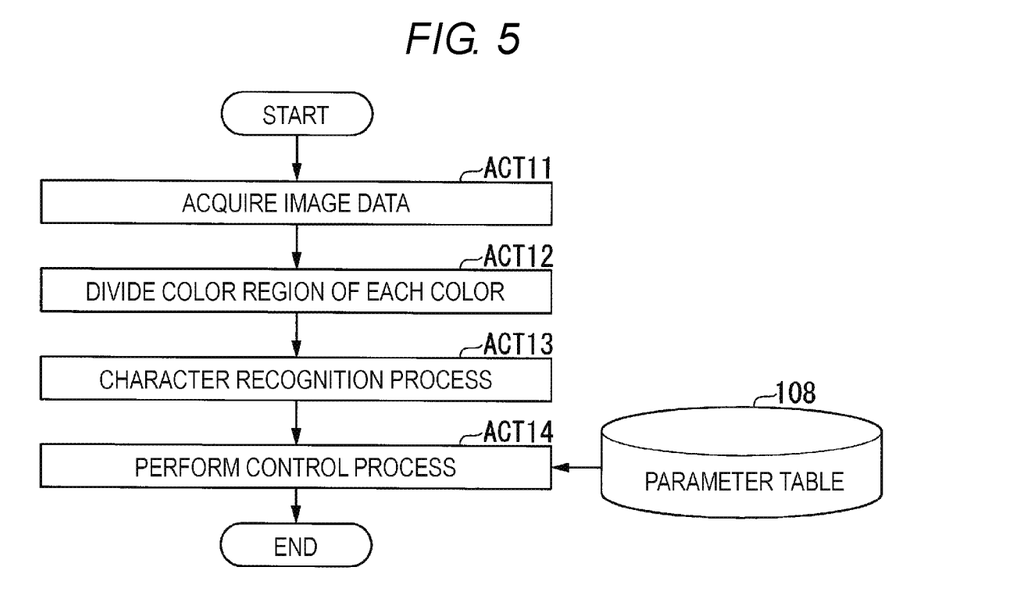
FIG. 5 is a diagram illustrating a process flow of the image processing apparatus.

FIG. 5 is a diagram illustrating a process flow of the image processing apparatus 100 according to the embodiment. The acquisition unit 110 of the image processing apparatus 100 acquires image data (ACT11). Specifically, the acquisition unit 110 acquires the image data output by the image reading unit 201 via the communication module 102. The acquisition unit 110 may acquire the image data stored in a storage device such as the HDD 106.

The region determination unit 111 extracts a color region of each color in the image data acquired by the acquisition unit 110 (ACT12). The region determination unit 111 extracts a range in which a character string is described with the same color in the image data as a color region. The region determination unit 111 extracts a range in which a character string is decorated with the same color in the image data as a color region. For each color, the region determination unit 111 detects the color region in which the character string is described with the color from the image data.

In the example of the document image in FIG. 3, the region determination unit 111 respectively detects the color regions 11*a* to 11*g* from the image data of the document image 10. Hereinafter, when not being distinguished, the color regions 11*a* to 11*g* are referred to as the color regions 11. Specifically, the region determination unit 111 extracts each color region 11 as follows, for example. The region determination unit 111 divides the image data into tiles with a predetermined size and acquires an average value of the color information of each tile. The tile includes a plurality of adjacent pixels. The color information is, for example, red-green-blue (RGB) values. The region determination unit 111 compares the average value for each tile to the average value of adjacent tiles to determine differences (e.g., difference values, etc.) between the average value of the tile and the average value of each adjacent tile. The region determination unit 111 then compares the differences to a predetermined range. When a difference is within the predetermined range, the adjacent tile associated with the difference is termed a "detected tile." The region determination unit 111 detects a region including the plurality of detected tiles as the color region 11. The region determination unit 111 detects the color of the detected color region 11 based on the image data.

The region determination unit 111 may detect each color region 11 in accordance with another method. Similarly, the region determination unit 111 divides the image data into tiles with a predetermined size and acquires an average value of the color information of each tile. The region determination unit 111 maintains a sample value of the color information of each color (for example, black, red, blue, green, and yellow) in advance. The region determination unit 111 detects a plurality of adjacent tiles in which a difference between the average value and a sample value of the color information of each color is within a predetermined range. The region determination unit 111 detects a region including the plurality of detected tiles as the color region 11.

The region determination unit 111 may detect the color region 11 surrounded by a marker or the like as follows. The region determination unit 111 acquires the color information of each pixel while scanning each pixel of the image data in sequence from the top left end. The region determination unit 111 determines that pixels of similar color information continue when the difference in the color information of the pixels of the before and after in a scanning sequence is within the predetermined range. In this case, the region determination unit 111 determines whether the pixels in the periphery of the pixels of the similar color information that continue have the similar color information. The region determination unit 111 detects a pixel group demarcating a rectangle, an ellipse, or the like with the similar color information based on the positions of the peripheral pixels with the similar color information. The region determination unit 111 detects the color region 11 based on the detected pixel group.

A method of detecting the color region 11 is not limited to the above-described example. The region determination unit 111 can detect each color region 11 in the image data in accordance with any of various generally known technologies of image processing.

The character recognition unit 112 performs the OCR process on each color region 11 detected by the region determination unit 111. Thus, the character recognition unit 112 detects the character string included in each color region 11 as text data (ACT13). In the example of the document image in FIG. 3, the character recognition unit 112 detects the character strings included in the color regions 11a to 11g of the image data. Specifically, the character recognition unit 112 performs the OCR process of the color region 11a to detect the character string "ABC document." The character recognition unit 112 similarly detects character strings in other color regions. Thus, the character string of each color in the image data is detected. As described above, the character string of each color includes a character string described with a predetermined color and a character string decorated with a predetermined color.

In the process flow of FIG. 5, the character recognition process (ACT13) performed after the process of detecting the color regions 11 (ACT12) will be exemplified. However, an exemplary embodiment is not limited to this example. For example, by performing the process of detecting the color region 11 (ACT12) after the character recognition process (ACT13), the character string of each color may be detected from the image data.

In this case, for example, the character recognition unit 112 performs the OCR process on the entire image data to detect the character strings. The region determination unit 111 acquires each character string and the color information of the peripheral pixels of the character string based on the image data. The region determination unit 111 detects the character string of the similar color information among the continuous character strings. Alternatively, the region determination unit 111 detects the character string surrounded with the similar color information among the continuous character strings. Thus, the character string of each color included in the image data can be detected.

The control processing unit 113 performs the control process associated with each color using the character string of the color with reference to the parameter table 108 (ACT14). Specifically, the control processing unit 113 acquires content of the control process associated with each color with reference to the parameter table 108. The control processing unit 113 acquires the character string of each color detected by the character recognition unit 112. The control processing unit 113 performs the control process associated with the color of the acquired character string using the character string.

Here, an example of a process (ACT14) of the control processing unit 113 will be described with reference to the document image 10 in FIG. 3 and the parameter table 108 in FIG. 4.

As described above, in the document image 10 in FIG. 3, the document name "ABC document" is described with red in the color region 11a. In the color region 11c, the division name "DDD business division" is described with blue. In color regions 11d and 11f, the documents are described with black. The control processing unit 113 acquires content of the control process associated with colors "red," "blue," and "black" with reference to the parameter table 108. As described above, the control process "STORED AS CONTENT OF FILE 1" is associated with color "black." The control process "DESIGNATED AS FILE NAME OF FILE 1" is associated with color "red." The control process "DESIGNATED AS FOLDER NAME" is associated with color "blue."

Accordingly, the control processing unit 113 generates a file that stores (e.g., is populated with, etc.) the documents of the color regions 11d and 11f. The control processing unit 113 sets the file name of the generated file in the character string "ABC document." The control processing unit 113 stores the generated file under the folder of the folder name "DDD business division." The folder "DDD business division" may be an existing folder or a newly generated folder.

In the embodiment, the name of the folder (the DDD business division) designated as the folder name is exemplified, as described above, but an exemplary embodiment is not limited to this example. A full path name indicating the name and the hierarchy of the folder may be designated as the folder name.

Similarly, in the color region 11c, a line is drawn on the date "YYYY/MM/DD" with the yellow highlighting marker and the documents of the color regions 11e and 11g are surrounded with a green marker. The control processing unit 113 generates the file that stores the character strings of the color regions 11e and 11g and sets the file name of the generated file in the character string "YYYY/MM/DD." The control processing unit 113 stores the generated file under the folder "DDD business division."

In this way, in the embodiment, the control process of using the character string as the file name is associated with the first color and the control process of storing the character string in the file is associated with the second color. In the image processing apparatus 100, the user who generates the file that stores the character string of the second color and has the character string of the first color as the file name generates, for example, the document image 10 in which a desired character string is described or decorated with a predetermined color as the file name or the folder name. For example, the user may write the character string with the predetermined color on the printed document image 10. The user may decorate the character string of the printed document image 10 with the predetermined color. Thus, the image processing apparatus 100 can generate the file that has the desired name and stores the character string included in the image data.

The document image 10 may include a handwritten character string and decoration. For example, when a discussion is performed based on the document image 10, information is written with a red or blue pen on the document image 10 in some cases. For example, the user writes the character string desired to be designated as the file name with a red pen or the like on the document image 10.

The user surrounds the character string within the document image 10 desired to be stored as another file with a green marker or the like. Thus, the image processing apparatus 100 can generate a file that has a file name designated with red and has a document described in advance in the document image 10 as content. The image processing apparatus 100 can store a character string described with green in the document image 10 in another file.

As described above, the image data may be image data of a printed image of a whiteboard. Character strings are written with markers of a plurality of colors on the whiteboard. For example, important information is written with a red marker. In this case, for example, the image processing apparatus 100 can efficiently utilize the important information by associating a predetermined control process with the red character string.

MODIFICATION EXAMPLE 1

Another example of the control process will be described in Modification Example 1.

Modification Example 1 may be used in combination of the first embodiment.

Figure 6:
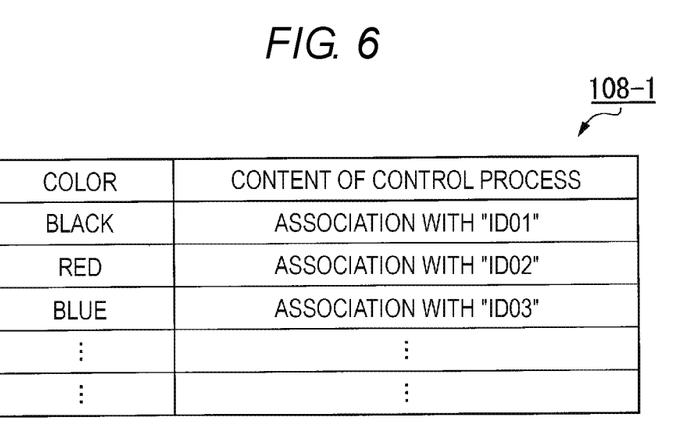
FIG. 6 is a diagram illustrating a second example of parameters.

FIG. 6 is a diagram illustrating an example of a parameter table 108-1 according to Modification Example 1. As described in FIG. 4, the parameter table 108-1 has a correspondent relation between colors and content of control processes. In the parameter table 108-1 illustrated in FIG. 6, a process of associating predetermined identification information with a character string corresponds for each color. Specifically, association with identification information "ID01" corresponds to color "black." Association with identification information "ID02" corresponds to color "red" and association with identification information "ID03" corresponds to color "blue." The control processing unit 113 outputs the identification information in accordance with the color in association with a character string acquired through the OCR process. Accordingly, the control processing unit 113 associates the identification information "ID01" with the documents of the color regions 11d and 11f and associates the identification information "ID02" with the character string "ABC document." The control processing unit 113 associates the identification information "ID03" with the character string "DDD business division."

In Modification Example 1, the control processing unit 113 outputs each character string associated with the identification information to the same file, as an example.

Figure 7:
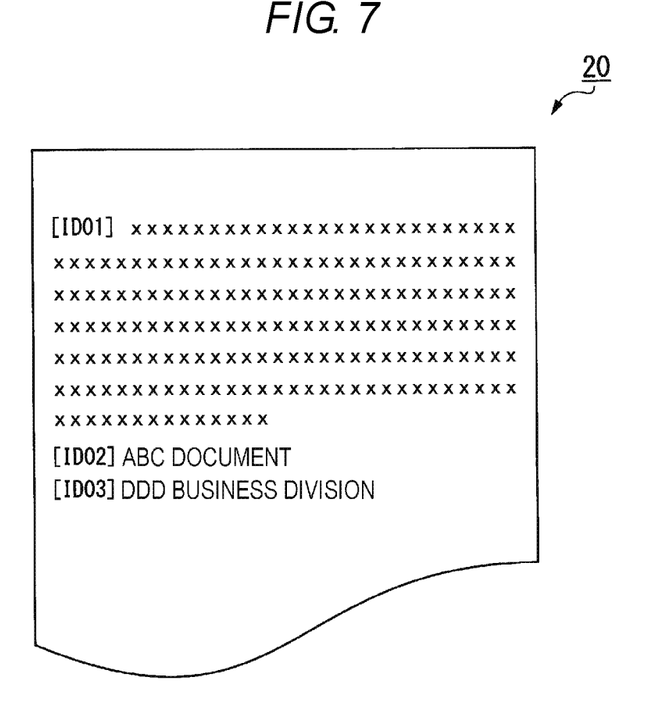
FIG. 7 is a diagram illustrating an example of data output by the image processing apparatus.

FIG. 7 is a diagram illustrating an example of an output file according to Modification Example 1. In an output file 20 illustrated in FIG. 7, the identification information "ID01" is given in the beginning of the documents of the color regions 11d and 11f. Similarly, the identification information "ID02" is given in the beginning of the character string "ABC document" and the identification information "ID03" is given in the beginning of the character string "DDD business division."

In this way, the identification information is given to the character string. Thus, for example, the user can identify a type of each character string based on the identification information with reference to the output file 20. Another application can read the output file 20 and register the character strings in a database based on the identification information. For example, the other application registers each character string of the output file 20 as data in items in accordance with the identification information of the database.

The identification information is not limited to the example illustrated in FIG. 6. For example, the identification information may be a tag of a markup language. In this case, for example, information given in the beginning of the character string and identification information including information given to the end of the character string are designated. Thus, the control processing unit 113 can generate a file in which a predetermined tag is given to each character string after the OCR process.

In this way, in Modification Example 1, a control process of adding predetermined identification information to a character string to output the predetermined identification information is associated with third color. The image processing apparatus 100 detects the character string with the third color in the image data and adds (e.g., appends, etc.) predetermined identification information to the character string to output the predetermined identification information. That is, the image processing apparatus 100 adds the predetermined identification information to a character string with a color associated with the predetermined identification information to output the predetermined identification information. For example, the user generates the document image 10 in which the character string associated with desired identification information is described or decorated in accordance with the color corresponding to the identification information. Thus, the image processing apparatus 100 can give the predetermined identification information in accordance with the color to the character string based on the image data of the document image 10.

MODIFICATION EXAMPLE 2

Another example of the control process will be described in Modification Example 2.

Modification Example 2 may be used in combination of one or both of the first embodiment and Modification Example 1.

Although not illustrated, in Modification Example 2, output of a character string to a predetermined output destination is associated for each color as content of the control process in the parameter table 108. The output destination is, for example, another application operating on the image processing apparatus 100. The output destination may be a process, a thread, or the like operating on the image processing apparatus 100. The output destination may be an existing file.

In the parameter table 108, for example, output of an application to a process A is associated with color "black." Output of a process B of an application is associated with color "red."

Accordingly, the control processing unit 113 outputs the documents of the color regions 11d and 11f to the process A of the application. The control processing unit 113 outputs the character string "ABC document" to the process B of the application. For example, the control processing unit 113 outputs the character string to a process of an output destination through communication between the processes.

In this way, in Modification Example 2, the control process of outputting the character string to the predetermined output destination is associated with the third color. The image processing apparatus 100 detects the character string with the third color in the image data and outputs the character string to the predetermined output destination. That is, the image processing apparatus 100 outputs the character string of the color associated with the output to the predetermined output destination to the predetermined output destination. For example, the user generates the document image 10 in which a character string desired to be output to a desired output destination is described or decorated in accordance with the color corresponding to the output destination. Thus, the image processing apparatus 100 can output the character string to a corresponding output destination, based on the image data of the document image 10.

In this way, the image processing apparatus 100 according to the first embodiment includes the acquisition unit 110 that acquires the image data and the control units (111 to 113). The control units detects the character string of each color included in the image data and performs the control process associated with the color using the character string of the color.

Thus, the control process for the character string acquired through the OCR process in the image data of the document image 10 can be designated in advance. In other words, the control process for the character string acquired through the OCR process can be designated in accordance with a color. The image processing apparatus 100 can perform the control process associated with the color using the character string of each color based on the color of the character string included in the image data. Accordingly, the user can perform the process in accordance with the color without performing an operation after the OCR process by including the character string of a predetermined color in the document image 10. Thus, it is possible to reduce complexity of an operation on the character string acquired through the OCR process.

The image processing apparatus 100 can cause the control process after the OCR process to be different for each color corresponding to the character string. Thus, any control process can be designated for each color. By generating the parameter table 108 for each piece of image data, it is possible to cause the control process to be different in accordance with the image data.

In the embodiment, the image processing apparatus 100 is separate from the image forming apparatus 200, as exemplified above, but the image processing apparatus 100 may be included in the image forming apparatus 200 in other embodiments. In this case, after a process of reading the document image 10 is performed by the image reading unit 201, a process of the image processing apparatus 100 according to the embodiment is performed. That is, after the document image is read, the control process corresponding to the color of a character string can be performed using the character string included in the image data. Thus, it is possible to reduce complexity of an operation on the character string of the image data.

Second Embodiment

The image processing apparatus 100 according to a second embodiment performs a control process in cooperation with another apparatus. A configuration example of an image processing system according to the second embodiment is similar to that of the first embodiment (see FIG. 1).

A functional configuration of the image processing apparatus 100 according to the second embodiment is also similar to that of the first embodiment (see FIG. 2). Process content of the control processing unit 113 according to the second embodiment is different from that of the first embodiment. Hereinafter, process content of the control processing unit 113 according to the second embodiment will be described with reference to a process flow.

Figure 8:
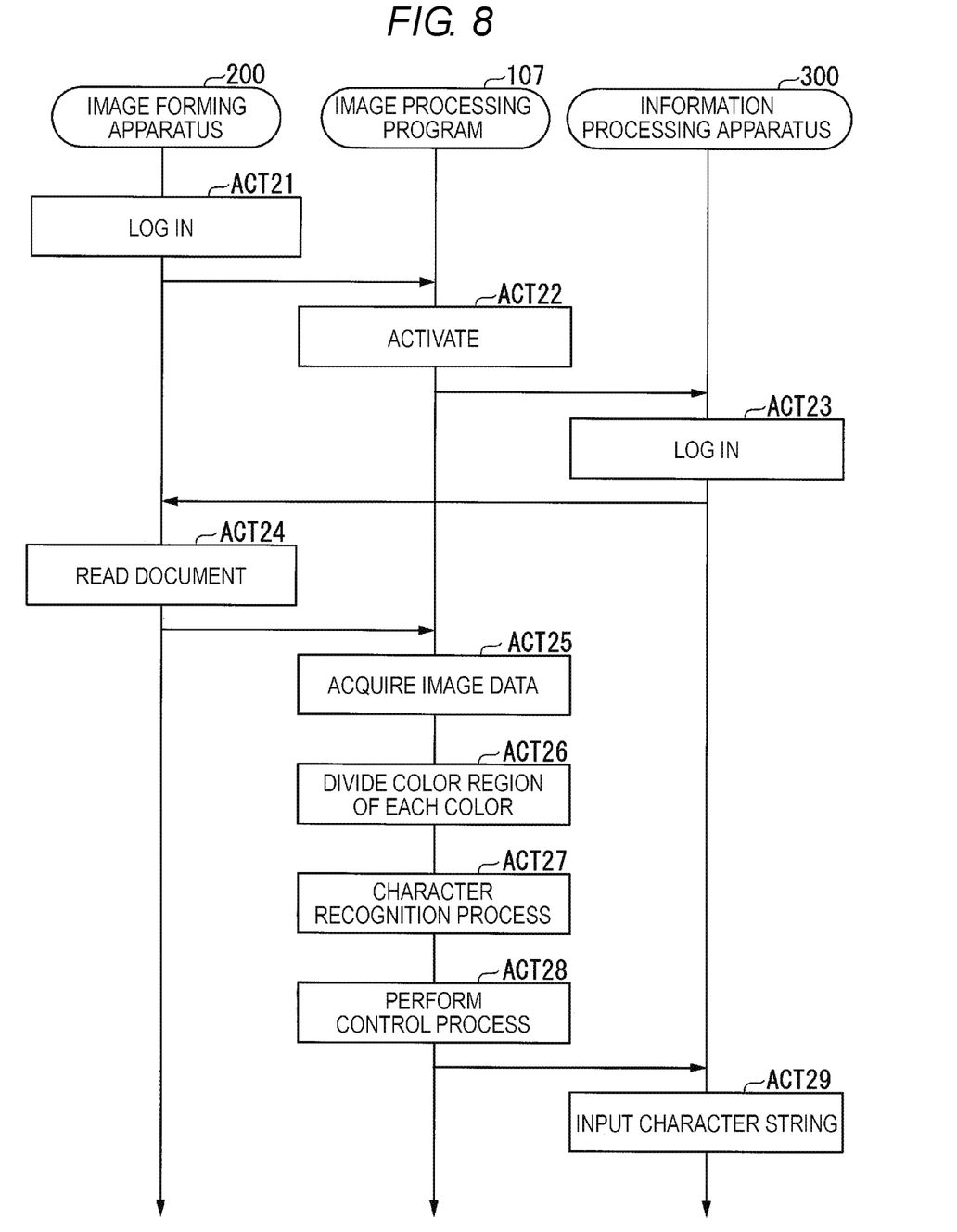
FIG. 8 is a diagram illustrating a process flow of an image processing system according to a second embodiment.

FIG. 8 is a diagram illustrating a process flow of an image processing system according to the embodiment. The information processing apparatus 300 according to the embodiment activates a cooperation program (not illustrated) that performs a process in cooperation with the image processing program 107. The cooperation program is, for example, a program that collects and manages data and classifies or analyzes the data. The cooperation program stores, for example, various kinds of data in a database (not illustrated).

The user logs in the image forming apparatus 200 (ACT21). Specifically, the image forming apparatus 200 displays a screen for receiving an input of an identification (ID) and a password. When the user inputs the ID and the password, the image forming apparatus 200 performs an authentication process. When the authentication succeeds, the image forming apparatus 200 performs an instruction to activate the image processing program 107 of the image processing apparatus 100.

The image processing program 107 of the image processing apparatus 100 performs an activation process (ACT22). The image forming apparatus 200 notifies the activated image processing program 107 of the input ID and password. The image processing program 107 notifies the information processing apparatus 300 of the ID and password notified by the image forming apparatus 200. The cooperation program operating in the information processing apparatus 300 performs an authentication process based on the ID and the password notified by the image processing apparatus 100 (ACT23). When the authentication succeeds, the cooperation program notifies the image forming apparatus 200 of information indicating success of the authentication.

When receiving the notification, the image forming apparatus 200 instructs the image reading unit 201 to read the document image 10. The image reading unit 201 reads the document image 10 and generates image data (ACT24). The image reading unit 201 transmits the generated image data to the image processing apparatus 100.

The image processing apparatus 100 acquires the image data transmitted from the image forming apparatus 200 (ACT25). The processes of ACT25 and ACT26 are similar to the processes of ACT12 and ACT13 described in FIG. 5. The control processing unit 113 performs the control process associated with the color using the character string of the color with reference to the parameter table 108 (ACT28).

In the embodiment, an application programming interface (API) called as content of the control process corresponds to the parameter table 108 for each color. The API is an API of the cooperation program. The image processing program 107 can use each function of the cooperation program, data to be managed, or the like by calling the API of the cooperation program. The API of the cooperation program is, for example, a command to register data, update data, or acquire data. Specifically, for example, a first API is a command to input data to an item X managed by the cooperation program. A second API is a command to input data to an item Y managed by the cooperation program. In the parameter table 108, for example, calling of the first API is associated with color "black." Calling of the second API is associated with color "green." When the control processing unit 113 calls the API associated with the color of the character string using the character string, the cooperation program performs a process of inputting the character string (ACT29). In the example of the document image 10 described in FIG. 3, the control processing unit 113 calls the first API using the character strings of the color regions 11*d* and 11*f*. The control processing unit 113 calls the second API using the character strings of the color regions 11*e* and 11*g*. Thus, the character strings of the color regions 11*d* and 11*f* are input to the item X of the data of the cooperation program and the character strings of the color regions 11*e* and 11*g* are input to the item Y.

In this way, for example, the user generates the document image 10 in which a character string desired to be input to each item of the cooperation program is described with a color corresponding to the item. Thus, the image processing apparatus 100 can input a character string after the OCR process as data of each item managed by the cooperation program.

As described above, when a discussion is performed using the document image 10, the user writes information with a red or blue pen on the document image 10 in some cases. The image processing apparatus 100 acquires the image data of the document image 10 written by the user. Thus, the image processing apparatus 100 can efficiently input the character string written with red or blue by the user to a predetermined item of the data of the cooperation program.

The API is not limited to the above-described content. The API may be, for example, a command to transmit an electronic mail. The API may be a command to output a character string to a predetermined process or thread of the cooperation program. In this case, the control processing unit 113 can output the character string described with a predetermined color to the process of the cooperation program associated with the color.

As described above, in the second embodiment, a control process of calling a predetermined API using a character string is associated with a fourth color. The image processing apparatus 100 includes the acquisition unit 110 that acquires the image data and the control units (111 to 113). The control unit detects the character string of each color included in the image data and calls a predetermined API using the character string of the fourth color. That is, the image processing apparatus 100 performs the API associated with a predetermined color using the character string with the predetermined color.

Thus, the image processing apparatus 100 can perform the API associated with the color using the character string of each color based on the color of the character string included in the image data. The user generates the document image 10 in which the character string used in calling of the desired API is described or decorated with the color corresponding to the desired API. Thus, the image processing apparatus 100 can generate a desired API using a desired character string without performing an operation after the OCR process based on the image data of the document image 10. Thus, it is possible to reduce complexity of an operation on the character string acquired through the OCR process.

The second embodiment may be used in combination of the first embodiment and Modification Examples 1 and 2. By using the embodiments in combination, it is possible to realize the control process using each character string of the image data more appropriately.

While certain embodiments have been described, these embodiments have been presented by way of example only, and are not intended to limit the scope of the present disclosure. Indeed, the novel embodiments described herein may be embodied in a variety of other forms: furthermore various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An image processing method implemented by an image processing apparatus including an acquisition unit that acquires image data and a control unit, the method comprising:

acquiring, by the acquisition unit, image data;

determining, by the control unit, that a first color is included in the image data;

detecting, by the control unit, a first character string in the image data, the first character string being of the first color;

associating, by the control unit, the first character string with the first color;

creating, by the control unit, a file having a file name;

populating, by the control unit, the file with the first character string;

determining, by the control unit, that a second color is included in the image data;

detecting, by the control unit, a second character string in the image data, the second character string being of the second color;

setting, by the control unit, the file name as the second character string;

determining, by the control unit, that a third color is included in the image data;

detecting, by the control unit, a third character string in the image data, the third character string being of the third color;

determining, by the control unit, an output destination based upon the third character string;

outputting, by the control unit, the third character string to the output destination;

determining, by the control unit, that a fourth color is included in the image data;

detecting, by the control unit, a fourth character string in the image data, the fourth character string being of the fourth color;

determining, by the control unit, an application programming interface based upon the fourth character string; and calling, by the control unit, the application programming interface.

2. The method of claim 1, further comprising:

determining, by the control unit, identification information based upon the third character string;

appending, by the control unit, the third character string with the identification information to form an appended character string; and outputting, by the control unit, the appended character string.

3. An image processing apparatus comprising:

an acquisition unit configured to acquire image data; and a control unit configured to:

determine that a first color is included in the image data;

detect a first character string in the image data based upon the first color;

associate the first character string with the first color;

create a file having a file name;

populate the file with the first character string;
determine that a second color is included in the image data;
detect a second character string in the image data based upon the second color;
set the file name as the second character string;
determine that a third color is included in the image data;
detect a third character string in the image data based on the third color;
determine an output destination based upon the third character string;
output the third character string to the output destination;
determine that a fourth color is included in the image data;
detect a fourth character string in the image data based on the fourth color;
determine an application programming interface based upon the fourth character string; and
call the application programming interface.

4. The image processing apparatus of claim 3, wherein the control unit is further configured to:
determine identification information based upon the third character string;
append the third character string with the identification information to form an appended character string; and
output the appended character string.

5. An apparatus comprising:
an acquisition unit configured to acquire image data; and
a control unit configured to:
determine that a first color is included in the image data;
determine that a second color is included in the image data;
determine a first character string in the image data that is of the first color;
determine a second character string in the image data that is of the second color;
create a first file having a first file name;
create a second file having a second file name;
populate the first file with the first character string;
populate the second file with the second character string;
determine that a third color is included in the image data;
determine a third character string in the image data that is of the third color;
determine if the third color is associated with the first color or the second color;
set the third character string as the first file name in response to determining that the third color is associated with the first color; and
set the third character string as the second file name in response to determining that the third color is associated with the second color.

6. The apparatus of claim 5, wherein the control unit is further configured to:
determine that a fourth color is included in the image data;
determine a fourth character string in the image data that is of the fourth color;
determine if the fourth color is associated with the first color or the second color;
set the fourth character string as the first file name in response to determining that the fourth color is associated with the first color; and
set the fourth character string as the second file name in response to determining that the fourth color is associated with the second color.

7. The apparatus of claim 5, wherein the control unit is further configured to:
create a folder having a folder name;
locate the first file in the folder;
locate the second file in the folder;
determine that a fourth color is included in the image data;
determine a fourth character string in the image data that is of the fourth color;
determine if the fourth color is associated with the third color; and
set the fourth character string as the folder name in response to determining that the fourth color is associated with the third color.

* * * * *